Oct. 14, 1924. 1,511,786
H. TERRISSE ET AL
PROCESS FOR CONVERTING CELLULOSE AND CELLULOSE YIELDING MATTER INTO
DEXTRINE AND GLUCOSE
Filed Feb. 25, 1920  2 Sheets-Sheet 1
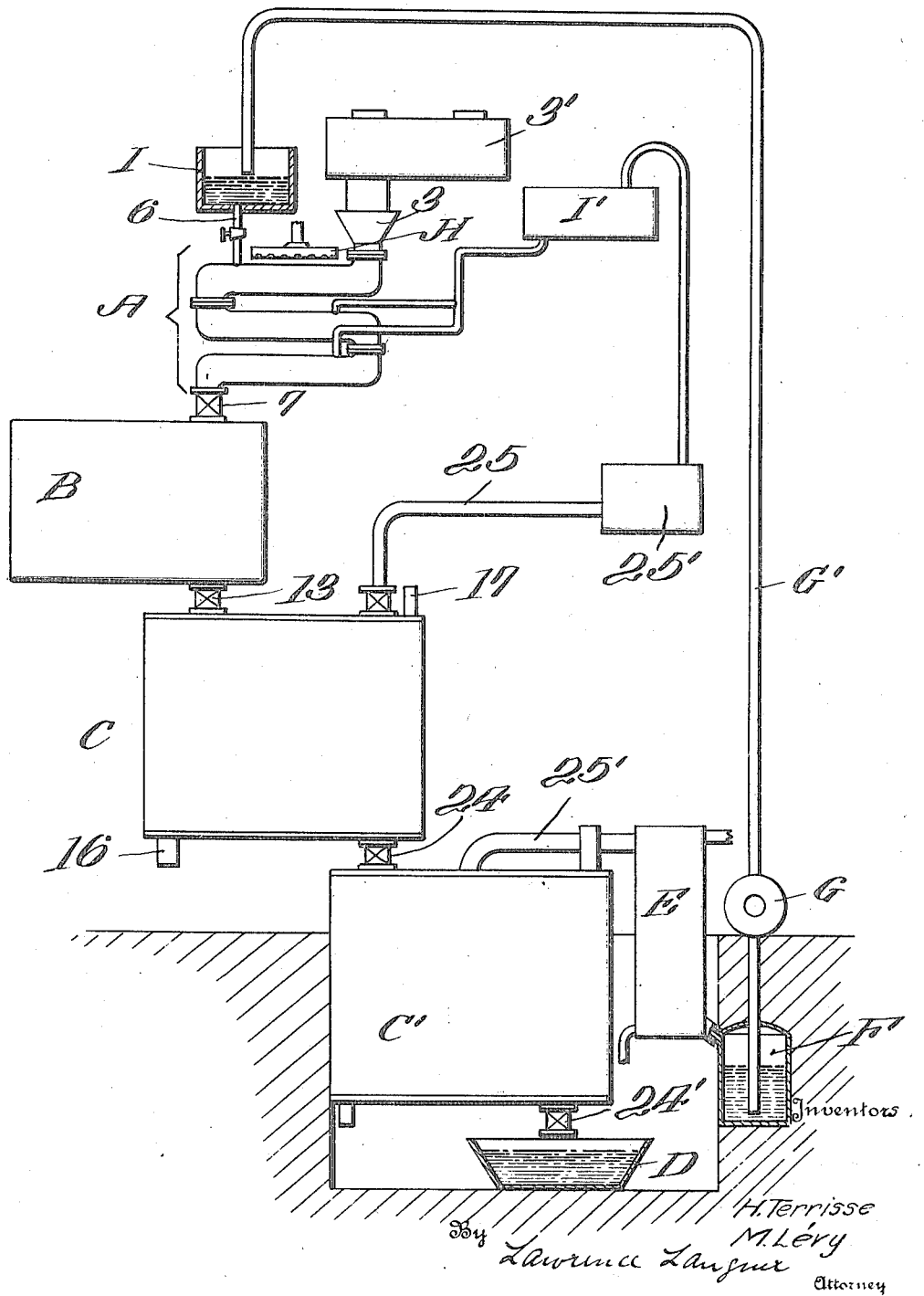

Oct. 14, 1924.
H. TERRISSE ET AL
1,511,786
PROCESS FOR CONVERTING CELLULOSE AND CELLULOSE YIELDING MATTER INTO DEXTRINE AND GLUCOSE
Filed Feb. 25, 1920    2 Sheets-Sheet 2
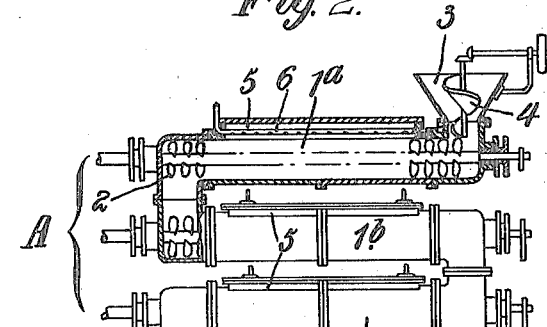
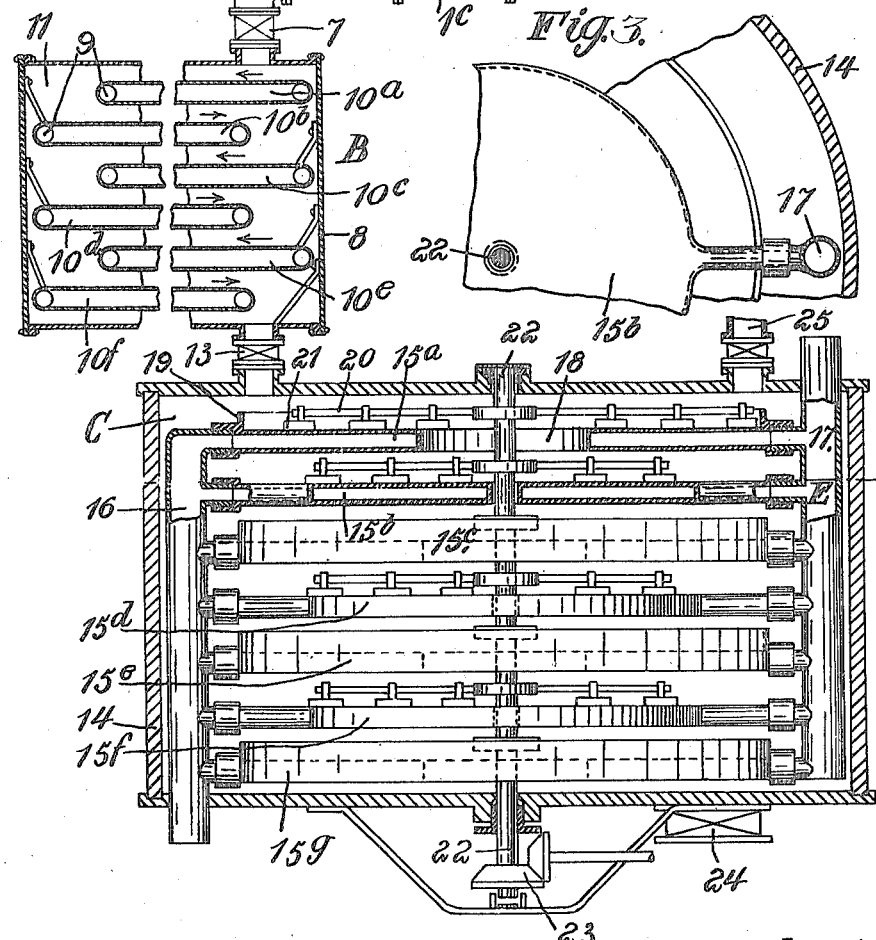
Inventors
Henri Terrisse & Marcel Levy
By Laurence Langner
Att'y Patented Oct. 14, 1924.

1,511,786

UNITED STATES PATENT OFFICE.

HENRI TERRISSE AND MARCEL LÉVY, OF GENEVA, SWITZERLAND.

PROCESS FOR CONVERTING CELLULOSE AND CELLULOSE-YIELDING MATTER INTO DEXTRINE AND GLUCOSE.

Application filed February 25, 1920. Serial No. 361,327.

*To all whom it may concern:*

Be it known that we, HENRI TERRISSE, a citizen of Switzerland, and MARCEL LÉVY, a subject of the King of Greece, residing at Geneva, in the Confederation of Switzerland, have invented certain new and useful Improvements in Processes for Converting Cellulose and Cellulose-Yielding Matter into Dextrine and Glucose, of which the following is a specification.

This invention relates to a process of and apparatus for transforming cellulose and substances containing cellulose into dextrine and glucose.

It is already known that the saccharization of cellulose by means of concentrated hydrochloric acid may be carried out so that the yield may be quantitative. The processes hitherto employed are more or less similar to that of Dangevillier's process German Patent No. 11,836.

In this hydrolysis two factors must be taken into account—namely the quantity of water present in the reacting material, which is concentrated hydrochloric acid, and the degree of saturation of this acid. The more the water is saturated with acid the smaller will be the amount of water necessary for a satisfactory hydrolysis. To obtain a strong saturation of the water by hydrochloric acid, either the temperature of the mass to be saccharized must be lowered or the pressure of the gaseous acid must be raised. In view of the fact that the cellulose-containing substances and more especially, that most commonly employed for the purpose, viz sawdust, are bad conductors of heat, the cooling of such substances when they are present in great quantity, is extremely difficult. In the process according to German Patent No. 304,399, the question of cooling the mass to be saccharized is not considered and the volume of water necessary for the attainment of a satisfactory hydrolysis is increased.

When large quantities of water are employed however a doughy or pasty product is obtained. Thus Schwalbe (German Patent 305,690) who operates similarly to Dangevillier only with somewhat less water, the quantity by weight which is made use of is smaller than that of the sawdust obtained, according to his own statement and after complete saccharization, a final product which belongs to the pasty class.

In the Willstaetter process (see Berichte der deutschen chem. Ges. 43 p. 23) about 40 parts water are used for 10 parts of dry saw dust. According to the German Patent 304,399 for the same quantity of sawdust, 13 parts of water are used. Many processes are further characterized by the fact that they employ large quantities of gaseous hydrochloric acid from which great difficulties arise both as regards its solution in the material to be saccharized and also in respect of its recovery. The solution of the gaseous hydrochloric acid in the substance referred to evolves great heat. If now, for the purpose of attaining a strong concentration in the acid, the substance has to be cooled, then the cooling process will become the more difficult, the greater the quantity of hydrochloric acid present.

If on the other hand, the material to be saturated is allowed to become warm then the higher the temperature the more pasty will the product become.

If the water percentage be too high, the cellulose mass assumes a pasty form and can, only with difficulty, be moved. A further objection to the pasty form of the reacting material is that there is an inadequate action of the gaseous hydrochloric acid on the wood-fibres and also the removal of the acid from the doughy material is rendered much more difficult so that it can only be recovered in a diluted form.

To overcome these drawbacks, in the process according to the present invention the amount of heat evolved is reduced to the theoretical minimum. This is attained by first drying the sawdust energetically and then drenching it with hydrochloric acid of 40% concentration. The product obtained is thereafter treated in the different apparatus in thin layers with a view to the recovery of the acid. For success in the procedure, it is of the greatest importance that, both for the saccharization of the material and for the recovery of the acid, the material should retain its powdery form, and this is effected by maintaining the mass in thin layers.

The present invention then, relates to a process, wherein these conditions are fulfilled and the disadvantages referred to above are removed.

The material, after being dried so as to contain about 5% water contents, which is the minimum percentage practically obtainable, is mixed and simultaneously cooled, within a closed vessel with a comparatively small quantity of hydrated hydrochloric acid of 40% strength and then treated with gaseous hydrochloric acid. During this operation a pressure slightly above atmospheric must be employed and the material in thin layers must be agitated in known manner.

By making use of material that has been vigorously dried in advance the treatment requires less gaseous hydrochloric acid and more 40% hydrated acid, since a definite quantity of water is necessary in order to obtain an adequate yield of dextrine. The reacting mass retains the form of a powdery substance which offers a satisfactory surface on which the acid can act and is easily movable throughout the reaction vessel.

The small quantity of gaseous hydrochloric acid can, as already mentioned, be readily expelled from the loose powdered mass and may be recovered, without its having to be removed, as was the case in the older processes, from a doughy mass, such a procedure being attended with great difficulties. In order to obtain a 63% yield of sugar, a 70% addition of the hydrated 40% hydrochloric acid has been found to be sufficient. Not more than about 5% of the acid, calculated with regard to the cellulose converted into sugar, becomes lost.

In carrying out the process the cellulose or the cellulose-containing material, such as sawdust, shavings, and the like, is reduced to a state of uniform desiccation so that not above 5% of moisture remains. 10 parts by weight of such dried material are then, while being cooled, mixed in thin layers within closed vessels with about 7 to 11 parts by weight of hydrochloric acid of some 40% strength and simultaneously supersaturated with about 2 parts by weight of gaseous hydrochloric acid. With a view to the formation of sugar, the mass in thin layers, is then digested at temperatures lying between 12° and 50° C. this operation demanding as long as 11 hours according to the temperature, even longer time being required if the temperature is very low. It is to be recommended also that the pressure be raised, during the process, by a few sulphuric acid column centimeters (i. e. 5–10 cm. of sulphuric acid or 1 cm. of mercury) by means of the hydrochloric acid gas or, alternatively that the mass be heated to a temperature a few degrees above that of saturation so as to create a pressure above atmospheric. By this means the formation of dextrine is completed and, when, for instance the material treated is shavings, a black-gray, porous substance is obtained which smells strongly in the open air.

As regards the recovery of the hydrochloric acid, that is, in the first instance carried out only partially by emptying the mass from the digestion-holder into another receiver in which is maintained a temperature of from 15° to 30° C., the receiver being connected with an exhauster which draws off the readily volatilizable gases and conveys them to a compressor where they are compressed, or conducts them into a washing apparatus. The mass which has, in this manner, been set free from a portion of its hydrochloric acid gas, then at a temperature of about 50° C. is exposed, in a third holder to a vacuum reaching as low as 1–6 centimetres mercury, or else exposed to a current of warm air, the holder being then put in communication with a washing-vessel containing water or a weak solution of hydrochloric acid, so as to cause any free gaseous or liquid acid still present in the mass to distill over.

Both the gaseous acid and the liquid acid solution recovered in the wash-vessel, may be employed again for the supersaturation of the cellulose that has been moistened with the acid or for the moistening of dry cellulose.

The resulting product, which has now been deprived almost entirely of its free hydrochloric acid, is thereafter, as usual with the addition of water, boiled in large vats for the purpose of converting the dextrine into glucose. In this way a solution of glucose is obtained in which only traces of the acid are to be found. If however wood-refuse has been employed there remains, still further, the inconvertible lignin, which is in the suspended state and must be removed. To effect this, the mass is neutralized with calcium-oxide (lime) and allowed to ferment, or filtration is employed and the filtrate allowed to ferment. The lignin that is separated out, is perfectly free from tar and fairly pure. If then the intention is to procure dextrine, the mass is filtered and completely neutralized in a concentrated solution and thereafter the liquid solution is caused to evaporate in a rarified atmosphere.

The advantage of the process just described is that, since it starts with a raw material that has already been uniformly dried, all irregularities in the manufacture are avoided. A saving is also effected in the hydrochloric acid gas required for supersaturation and less apparatus is necessary for carrying the process out, as a smaller amount of reaction heat is given off. As a concentrated solution is also sooner reached, the heat given off in super-saturation is likewise less. The gaseous and the concentrated (liquid) portions of the acid are, in the course of the process, restored to the same forms, in which they were initially. This is not the case in any of the processes formerly known.

In consequence of the simplification of the operations the process may be carried out in uninterrupted sequence, either partially or completely so far as the fermentation stage. The advantage of the uninterrupted manner of working consists more particularly in the almost perfect avoidance of any loss of the concentrated acid.

When sawdust is employed, after saccharization, a final product is obtained, which does not bake together but retains its original powdery loose form, a characteristic completely unknown in the already disclosed processes. It is owing to this property of the product that it is possible to almost entirely recover the hydrochloric acid. In every other process, on the contrary, when digestion of the cellulose has taken place and it has been converted into dextrine, the product yielded is a pasty one from which the acid that has been employed can only be recovered with very great difficulty and usually, only in hydrated form.

In the drawing is shown, by way of example, a plant for the uninterrupted practical carrying out of the process described above.

Fig. 1 is a diagrammatical showing of a plant for carrying out the complete cycle.

Fig. 2 is a sectional view of portions of a plant for carrying out the process.

Fig. 3 shows a detail of Fig. 2.

The apparatus A (Fig. 2) is adapted for the mixing of the cellulose-containing material, such as sawdust, which is to be treated, with liquid hydrochloric acid and thereafter for the supersaturation of the mixture with the acid gas. The sawdust before being placed into the mixing apparatus A, is dried so as to contain only about 5 per cent of water.

This mixing-installation A consists of three pipes or tubes $1^a$, $1^b$, $1^c$ arranged zig-zag above each other and communicating with one another by bent pipes which must be constructed of some acid-resisting material such as stoneware.

Each one of these mixing-pipes, contains a worm-conveyer 2 which advances the sawdust, which is meanwhile steadily agitated along the pipe in question. At the free end of the pipe $1^a$, is mounted a charging-funnel 3 having a worm-agitator 4 and intended to receive the pre-dried sawdust.

Extending longitudinally along the upper side of each pipe $1^a$, $1^b$, $1^c$ there is fitted a member 5, into which penetrates a perforated tube 6 of acid-proof material.

The tube 6 of the mixing cylinder $1^a$ is connected with a holder, for concentrated 40% hydrochloric acid so that throughout its entire passage along this pipe, the sawdust is drenched with this acid. The supply of the latter is adjusted in accordance with the quantity of sawdust fed in.

The tubes inside the members 5 of the mixing-cylinders $1^b$, $1^c$, are also put in communication with a source of acid gas, and by this means super-saturation by the acid drenching the sawdust is effected. During this concentration the hydration of the wood-cellulose takes place in such a manner that, the further it is conveyed, the more the cellulose shrinks together and yields up the space it occupied, so that the digesting vessel employed for the second stage of the process may be chosen to be of materially smaller dimensions corresponding to the quantity of sawdust introduced into the charging-funnel 3. Throughout the entire mixing operation the pipes $1^a$, $1^b$, and $1^c$ are continuously laved or sprayed externally with cold water or are cooled in some other way so as to maintain the material under treatment at a low temperature. It is necessary to regulate the feeding of the material into the funnel 3 so that only a thin layer of the material reaches the mixing-apparatus for treatment and drenching.

Through the valve-passage 7, the sawdust which is now thoroughly supersaturated with hydrochloric acid, reaches the digesting apparatus B, which is constructed of acid-resisting material. Within the latter the wood-cellulose is converted into a mixture of glucose and dextrine.

The closed chest 8 of the digesting installation B contains a number of endless bands—$10^a$–$10^f$, inclusive, arranged one above the other, but running in different directions on rollers 9. The mass passing through valve 7 is deposited on the band $10^a$. As the latter advances in the direction of the arrow, the material is carried along with it, passing at 11 from the band $10^a$ to the band $10^b$, and so on, until it arrives at the controllable outlet 13. The motion of the bands $10^a$–$10^f$ is so regulated that the material remains in the digesting apparatus B long enough for the saccharization of the cellulose to be completed. It will be understood that as only a relatively small portion of material is fed into the mixing apparatus for treatment, only a small portion of material will be discharged through the valve 7 on the band $10^a$. The upper portion of this band travels in the direction indicated by the arrow and the material which passes through the valve 7 is disposed in thin layers on the upper surface of the band $10^a$.

When this operation is over, the mass then passes through the valve 13 into the apparatus C, which serves for the recovery of the hydrochloric acid. The latter consists of a vertically disposed cylinder 14 made of acid-resisting material and also capable of resisting external pressure. The cylinder 14 contains a number of plates $15^a$, $15^b$, $15^c$, $15^d$, $15^e$, $15^f$, $15^g$ arranged one above the other and constructed also of acid-resisting material. The said plates are hollow and adapted to be heated by warm water or hot air, the latter being supplied to them through a pipe 17 and discharged by a pipe 16. The plate $15^a$ is provided, at its centre, with an opening 18 and at its outer periphery, with an upwardly projecting edge 19. The plate next in order, $15^b$, has a smaller diameter than $15^a$, and has neither the upturned edge nor the central aperture characterizing plate $15^a$. The plate $15^c$ however is constructed similarly to $15^a$ whilst $15^d$ resembles $15^b$, and so on alternately. Over each of these plates $15^a$–$15^g$, on arms 20 are located oppositely directed scrapers 21. These double-arms 20 are secured to a vertical shaft 22, which is mounted in the central axis of the casing 14, and is driven by a toothed gear 23 arranged on the bottom of the casing. The scrapers are inclined to the direction of rotation of the arms in such a manner that the material after arriving through valve 13, inside the casing is conveyed, in a thin layer, towards the openings 18 on one set of plates and towards the outer edge on the other set, falling from one plate to the one immediately below until it reaches the outlet-pipe 24, which communicates with a second apparatus C′, of structure similar to C, (Fig. 1). Within this last installation the material is, as mentioned below, subjected to a higher temperature and to a higher vacuum than in C so as to deprive it, as nearly as possible, of all acid. From here the material passes into a collector reservoir D shown in Figure 1.

The hydrochloric acid and aqueous vapors evolved during the passage of material over the heating plates of the apparatuses C and C′ are drawn off through the pipes 25, 25′ and conducted back to their respective holders.

In Figure 1, is shown in diagrammatic form the complete apparatus. Tank I contains hydrochloric acid at 40%. The tube 6, provided with a cock and means as shown in Fig. 2, conducts the acid into the apparatus A. The apparatus A adapted for mixing cellulose containing material, such as sawdust, as is shown in Fig. 2, is provided at the free end of the pipe or tube $1^a$ with a charging funnel 3, through which the cellulose material from a drier 3′, is supplied to the apparatus A. The sawdust moistened with hydrochloric acid, with hydrochloric acid gas from tank I′ is successively passed through the three pipes $1^a$, $1^b$, $1^c$ cooled by a water spray H, and from that latter by means of a valve passage 7 into a digesting device B as shown in detail in Fig. 2.

The material then reaches the outlet pipe 13 and passes into an apparatus C shown in detail in Fig. 2, where the material spread in thin layers, is subjeced to a medium temperature and vacuum so as to suck gaseous acid through 25 and into tank I′, as nearly as possible by means of exhauster 25′. Heated water or hot air for heating C is supplied to the same through a pipe 17 and discharged by a pipe 16.

From here the material passes through 24 to tank C′, where it is subjected to a higher temperature than in C so as to deprive it, as nearly as possible, of all acid.

From C′, the dried material which always remains in a powdery form, passes through an outlet pipe 24′ and in a collector tank D containing water, and in which, by hydrolyzing the dextrine, the glucose is obtained.

The hydrochloric acid and the aqueous vapor, evolved during the passage of material over the heated plates of the apparatus C′, are drawn off through a pipe 25′ and conducted into a condenser E. The condensed hydrochloric acid flows into a container F and from there is pumped back into the tank I, by means of a pump G and connecting pipes G′.

The treatment and conversion of the cellulose containing substance as well as the recovery of the hydrochloric acid, is carried out continuously.

The process just described, in contradistinction to the processes hitherto known, has the following important advantages:

1. The employment of starting material that has been dried.

2. From beginning to end, or from the treatment of the primary material with hydrochloric acid up to the fermentation of the sugar solution obtained there need be no interruption or break in the sequence of the various operations.

3. The hydrochloric acid employed, both gaseous and in the liquid form, may be recovered and again utilized for the same purposes, in the process.

Having now particularly described and ascertained the nature of our said invention and in what manner the same is to be performed, we declare that what we claim is:

1. The process of converting a cellulose-containing substance into dextrine and glucose, comprising preliminarily drying the substance to expel practically all of the moisture therefrom, conveying said substance in a thin layer through a mixing chamber subjected to the action of cooling means, simultaneously mixing with said substance while being conveyed through said chamber liquid hydrochloric acid concentrated to about 40% and supersaturating it with gaseous hydrochloric acid, thereafter digesting said substance in a thin layer while subjecting it to a temperature of between 12° and 50° C. and to a hydrochloric acid gas pressure slightly greater than atmospheric pressure, recovering hydrochloric acid from the digested substance and then treating the substance to convert it into glucose.

2. The process according to claim 1 in which approximately 10 parts by weights of the previously dried material are mixed with between 7 and 11 parts by weight of the liquid hydrochloric acid and supersaturated with approximately two parts by weight of the gaseous hydrochloric acid.

3. The process of claim 1, said process being carried out continuously, from beginning to end.

4. The process of claim 2, said process being carried out continuously from beginning to end.

In testimony whereof we affix our signatures in presence of two witnesses.

HENRI TERRISSE.
MARCEL LÉVY.

Witnesses:
   Dr. ROD. DE WURTEMBERGER,
   THÉODORE TMER.